US010621678B1

(12) United States Patent
Ramotar et al.

(10) Patent No.: US 10,621,678 B1
(45) Date of Patent: Apr. 14, 2020

(54) SYSTEMS, METHODS AND ARTICLES FOR AUTOMATING ACCESS OF TAX DOCUMENTS FOR PREPARING AN ELECTRONIC TAX RETURN

(71) Applicant: INTUIT INC., Mountain View, CA (US)

(72) Inventors: Kissoon John Ramotar, Frisco, TX (US); Steven Karl Wheelis, Frisco, TX (US); Lior Y. Sharon, Frisco, TX (US); Preetha Veeraraghavan, Plano, TX (US)

(73) Assignee: INTUIT INC., Mountain View, CA (US)

( * ) Notice: Subject to any disclaimer, the term of this patent is extended or adjusted under 35 U.S.C. 154(b) by 447 days.

(21) Appl. No.: 15/415,448

(22) Filed: Jan. 25, 2017

(51) Int. Cl.
*G06Q 40/00* (2012.01)
*H04L 29/06* (2006.01)
*G06F 16/25* (2019.01)

(52) U.S. Cl.
CPC ......... *G06Q 40/123* (2013.12); *G06F 16/258* (2019.01); *H04L 63/08* (2013.01); *G06Q 40/00* (2013.01)

(58) Field of Classification Search
CPC .................................................. G06Q 40/123
See application file for complete search history.

(56) References Cited

U.S. PATENT DOCUMENTS

| 7,752,092 | B1* | 7/2010 | Mattice | G06F 17/2235 |
| | | | | 705/30 |
| 8,744,948 | B1* | 6/2014 | McVickar | G06Q 40/12 |
| | | | | 705/31 |
| 9,558,521 | B1* | 1/2017 | Eftekhari | G06Q 40/12 |
| 9,672,487 | B1* | 6/2017 | Garcia | G06Q 10/0633 |
| 9,916,627 | B1* | 3/2018 | Huang | G06Q 40/123 |
| 9,959,577 | B1* | 5/2018 | Mori | G06Q 40/123 |
| 10,198,774 | B1* | 2/2019 | Wang | G06Q 40/123 |
| 10,235,721 | B1* | 3/2019 | Cabrera | G06Q 40/123 |
| 2008/0147494 | A1* | 6/2008 | Larson | G06Q 30/0234 |
| | | | | 705/14.34 |

(Continued)

OTHER PUBLICATIONS

Tankersley, Tax Document Automation Tools Come of Age, Jul. 2011, CPAPracticeAdvisor. (Year: 2011).*

*Primary Examiner* — Ryan D Donlon
*Assistant Examiner* — Abdulmajeed Aziz
(74) *Attorney, Agent, or Firm* — DLA Piper LLP (US)

(57) ABSTRACT

Systems, methods and articles of manufacture for preparing an electronic tax return for a taxpayer which automatically access tax documents from sources of tax documents, such as financial institutions at which the taxpayer has an account. The system receives a request from a tax preparer for tax data regarding a taxpayer. The system analyzes a prior year tax return for the taxpayer and identifies tax documents used to prepare the tax return. The system identifies the source and the type of tax document. The system generates a request to the taxpayer to access the tax documents for the current tax year. The request allows the taxpayer to provide account credentials to access the tax documents from the source. The system accesses the tax documents from the source using the account credentials. The system converts the tax documents into a standard data structure which is automatically imported into a tax return.

15 Claims, 12 Drawing Sheets

(56) References Cited

U.S. PATENT DOCUMENTS

| | | | | |
|---|---|---|---|---|
| 2009/0150169 A1* | 6/2009 | Kirkwood | ............ | G06Q 10/00 |
| | | | | 705/342 |
| 2012/0053965 A1* | 3/2012 | Hellman | ............... | G06Q 40/00 |
| | | | | 705/4 |
| 2012/0084185 A1* | 4/2012 | Ciaramitaro | ......... | G06Q 40/123 |
| | | | | 705/31 |
| 2012/0109792 A1* | 5/2012 | Eftekhari | ............... | G06F 21/31 |
| | | | | 705/31 |
| 2014/0172656 A1* | 6/2014 | Shaw | ................... | G06Q 40/00 |
| | | | | 705/31 |
| 2016/0217534 A1* | 7/2016 | Goldman | ............ | G06Q 40/123 |
| 2017/0286414 A1* | 10/2017 | Roebuck | ........... | G06K 9/00469 |

* cited by examiner

176

178

Scottrade, Inc. Documents　　　　　　　　　　　　　　✕

We added this 1099-DIV to Intuit Link:　180

✓ 1099-DIV_#0327_Scottrade-Inc--t　　　184 🗑

We also found and added these related documents:　182a

✓ 1099-INT_#0327_Scottrade-Inc--t　　　184 🗑

✓ 1099-B_#0327_Scottrade-Inc--t　　　　184 🗑

182b

Connect and go

We save your login info and connect periodically to get your documents the day they become available. We continue to check for corrected documents throughout the tax season.

☑ Connect automatically to Scottrade, Inc.

[Done]

ⓝ ProConnect Tax Online

| ⓘ | | Search ProConnect Tax St 🔍 | ⚙ Steve Wheelis |

188

🗐 Tax Returns
👥 Clients
⚡ E-File Dashboard
🖩 Purchase
🔗 Intuit Link
💬 Live Chat
⭐ EFIN Registration ❤ 2015 Tax Return - QBSE, Nima - 1

2015 ▸ Documents for QBSE, Nima
Documents requested though Intuit Link can be viewed here.
Request more data

Ready to Review
All | Documents | Questions

190

Search by keyword

192

| REQUEST | RESPONSE | SOURCE | LAST UPDATE | ACTION |
|---|---|---|---|---|
| 1099-INT | 📄 2015 1099-INT NavyArmy.pdf | Upload | Nov 14, 2016 1:11PM | Review & Import |
| 1098 | 📄 2015 1098_stonegate_mortgage.pdf.pdf | Upload | Nov 14, 2016 1:11PM | Review & Import |
| 1099-DIV | 📄 2015 1099-INT Frank Westor.pdf | Upload | Nov 14, 2016 1:11PM | Processing... |

Pending Requests

| REQUEST | | | DATE | |
|---|---|---|---|---|
| W2 from IBM | | | Nov 09, 2016 | |

SYSTEMS, METHODS AND ARTICLES FOR AUTOMATING ACCESS OF TAX DOCUMENTS FOR PREPARING AN ELECTRONIC TAX RETURN

BACKGROUND

Embodiments of the present invention are directed to systems, methods, and articles of manufacture for preparing an electronic tax return in which tax documents for a taxpayer are automatically accessed and converted into a standard data format to be imported into an electronic tax return thereby reducing the amount of user interaction required to prepare an electronic tax return while also reducing the amount of computing and network communication resources required.

Computerized (also referred to as "electronic") tax return systems have become very popular and allow a user, such as a taxpayer or a tax professional, to prepare and electronically file a tax return using a computing device (e.g. personal computer, tablet computer, smart phone, etc.). The tax preparation systems typically comprise a computer system having an electronic tax return software application. The tax preparation system may be a desktop computer having a tax preparation application that resides and operates on the computer operated by the user or an online system having a tax preparation application that resides on a server that is accessible by the user's computer via a network such as the internet. The interface for a server based system can be an internet browser or specialized software residing on the local computer. There are a number of examples of desktop software applications and online tax preparation applications for preparing tax returns. Examples of desktop applications are TurboTax® software for Microsoft Windows® based personal computers ("PC") and Apple® Mac® computers, Proseries® and Lacerte® tax preparation applications, which are known consumer and professional tax preparation applications available from Intuit Inc., Mountain View, Calif., H&R Block TaxCut software, available from H&R Block, Inc., Kansas City, Mo., and TaxACT® software available from 2nd Story Software, Inc. Examples of online tax return preparation applications are Turbotax® Online, H&R Block Online tax prep, and TaxACT® Online.

Whether a desktop system or an online system, the use of the application to prepare a computerized tax return is basically the same. For example, certain tax preparation applications present a list of tax-related questions or data entry fields to the user as a series of interview screens or fillable forms, in response to which the user enters the appropriate tax data and/or answers if they are known. For example, certain interview screens or questions may relate to personal and family information such as the user's social security number, marital status, number of dependents, etc. Other interview screens, questions and/or form field request tax data from tax documents related to the taxpayer's finances such as wages, retirement plan contributions, and social security, state and federal taxes that were paid or withheld, investments, deductible expenses and other tax deductions. This tax data is typically found on tax documents provided by employers, business entities and financial institutions, such as Form-W2 (employment income and other employment tax data), K-1 (tax data for partnerships, S corporations, estates and trusts), 1099-B (sales of securities, like stocks or mutual funds), 1099-DIV (dividends), 1099-MISC (independent contractor income), 1099-INT (interest income), 1099-MISC (miscellaneous income), 1098 (mortgage interest paid), etc.

Further, an electronic tax return may be a business or corporate return, and the tax data fields may, for example, relate to payments and benefits such as contributions to a retirement plan. Thus, data fields may relate to travel expenses or determinations of portions of expenses that are deductible.

Upon entry of all of the taxpayer data, the tax preparation system prepares an electronic tax return. The electronic tax return is then processed and formatted into an electronic tax return data file according to the requirements and specifications of the pertinent tax agency to which the tax return is being filed. Finally, the electronic tax return data file is filed with the appropriate tax authority such as the Internal Revenue Service (IRS), a state tax authority (e.g. California Franchise Tax Board), city tax authority, or other tax collecting agency, by transmitting the electronic tax return data file to the tax authority. Alternatively, the tax return data file can used to create a paper forms submission in which the tax return forms are printed and then submitted to the appropriate tax authority.

While these prior tax return preparation systems are useful, they do not have a comprehensive and automated means for accessing tax documents having tax data needed to prepare a tax return, and/or for automatically accessing updated tax documents when a tax document is corrected or changed. Consequently, although previous tax return preparation systems are widely used, they still require manually collecting and organizing tax documents and manually obtaining tax data from the tax documents for input into the computerized tax return preparation system. This results in significant time spent by a taxpayer and/or tax preparer even while using a computerized system, and also introduces significant chances of human error in the input of the tax data. Generating and displaying computer screens to allow for the manual input of tax data also increases the time and computing resources required to prepare an electronic tax return, and has other negative consequences, including user confusion, frustration and dissatisfaction with the tax return preparation system.

Accordingly, there is a need for improved computerized tax return preparation systems and methods which more fully automate the process of accessing tax documents and importing the tax data into a tax return.

SUMMARY

One embodiment of the present invention is directed to a method for preparing an electronic tax return which automatically accesses tax documents from sources of tax documents for a taxpayer, such as financial institutions, employers, and other sources of tax documents. The method may be implemented on a tax preparation system including a computer server having a one or more computer processors, memory, a storage device and a tax preparation software application. The tax preparation system is configured to execute the tax preparation software application to perform a process for preparing an electronic tax return for a tax year (e.g., the current tax year, or a previous tax year). The tax preparation system may be an online system such that the computer server comprises, or is in operable communication with, a website server which provides a website accessible by tax preparers (user) to prepare electronic tax returns, or it may be a local, standalone system operating on a local computer system, such as a desktop computer, notebook computer, tablet computer, smartphone, etc. Thus, a user can utilize the tax preparation system, for example, by accessing a website, or through other suitable means, such as direct access to the computer(s) of the system, or through a private network, or even through a mobile communication device such as a mobile phone, smartphone, or tablet computer.

The method of preparing an electronic tax return commences with a tax preparer requesting tax data regarding the taxpayer for the desired tax year. For example, a professional tax preparer, or a taxpayer itself, may access the system and indicate that the tax preparer desires to start a new tax return for the taxpayer. The system receives this as a request from the tax preparer to access tax data regarding the taxpayer. The system receives the request to access tax data for the taxpayer. The system accesses and analyzes one or more prior year(s) tax return(s) for the taxpayer to identify one or more prior year tax documents which were the source of tax data for preparing the prior year(s) tax return(s). For example, the system may store tax returns previously prepared on the system, and/or electronically access prior year tax returns from other sources. The system identifies the source (e.g., the financial institution for the taxpayer's account, the taxpayer's employer, etc.) and the type of document (e.g., 1098, 1099, W-2, etc.) for each prior year tax document.

The system then generates a request to the taxpayer for tax document for the tax year of the tax return currently being prepared which correspond to the identified tax documents. As used herein, the term "correspond" or "corresponding" with respect to a tax document means the same type of document and/or from the same source but for a different tax year. For instance, if an identified tax document is a 1099-INT from Acme Bank for the tax year 2015, and the tax return is being prepared for the 2016 tax year, the corresponding tax document is a 1099-INT from Acme Bank for the year 2016.

The system determines if the source for each corresponding tax document supports online download of the respective corresponding tax documents. For example, the system may have a database of all of the known entities which enable online download of tax documents via an online website or portal, or the system may ask the taxpayer to identify the source and/or select the source from a list of common sources that enable online download of tax documents. The online website or portal may be a user account website for which the taxpayer has an account and account credentials for accessing the taxpayer's account via the website.

For each of the corresponding tax documents available for online download, the system requests the account credentials from the taxpayer for the account at the source of the respective corresponding tax document. If the taxpayer provides the account credentials and authorizes the system to access the account for accessing tax documents, the system automatically accesses the corresponding tax document from the source using the account credentials. For instance, the system may access a website for the source, log into the website using the account credentials, and then access the corresponding tax document via the website. The system may download the tax document in the electronic file format provided by the source, such as a pdf, other image file, or a data file such as dat, xml, qif, etc.

For each of the corresponding tax documents which the system determines are not available for online download from the source, the system requests the taxpayer to electronically transmit the corresponding tax document to the system. The taxpayer may upload the document to the system, email it to the system, etc. The system receives the corresponding tax document and processes it to determine the tax data contained in the corresponding tax document. For instance, if the document is a pdf or other image file, the system may use optical character recognition (OCR) to determine the tax data contained in the document.

The system then converts the tax documents into a standard data structure so that the tax data contained in the tax documents may be imported into a tax return. The system may utilize a standard data structure for each type of tax document, and convert the tax documents into the standard data structure for the respective type of document. For example, a data record for a 1099-INT may be have particular standard 1099-INT data structure for which the system is configured to import the 1099-INT data record into a tax return.

In another aspect of the invention, the system may also utilize the tax data from the prior year tax return in preparing the tax return for the current tax year. In most cases, at least some of the tax data for the taxpayer will be the same from year to year, such as the taxpayer's name, address, social security number, employer, spouse, children, dependents, and the like. Hence, the system may merge such year to year unchanged tax data from the prior year tax return with the tax data from the corresponding tax documents. The system then converts the merged tax data into the standard data structure. The system can then automatically import the tax data in the standard data structure into a tax return for the taxpayer.

In still another aspect, the system presents the merged tax data to the tax preparer for review prior to automatically importing the tax data into the tax return. The system may display the tax data in any suitable manner, such as displaying the tax data in a list having options to review the respective tax document for each item of tax data, and to approve, edit and/or import each item of tax data into the tax return. Upon approval of the tax data, the system automatically imports the tax data into the tax return.

In another aspect, alternatively, the system may automatically import the tax data in the standard data structure into the tax return without first presenting it to the tax preparer for review and approval, and then present the tax return to the tax preparer for review. The tax preparer may then review the tax data in the tax return and make corrections, if needed. Once the tax preparer approves of the tax return, the system may electronically file the tax return with the appropriate tax agency.

In still another aspect of the invention, the method may include automatically accessing updated corresponding tax documents (referred to as "updated tax documents"), such as a corrected or amended tax document of a previously accessed corresponding tax document. The system may request and receive authorization from the taxpayer to automatically utilize the account credentials to access an updated tax document from the respective source. The system may then periodically check the source for an updated tax document using the account credentials. If there is an updated tax document, then the system automatically access the updated tax document, in the same manner as described herein for accessing a corresponding tax document. The system deletes or cancels out the previously accessed corresponding tax document, if one exists, and system processes the updated tax document as another corresponding tax document (i.e., it may be converted into a standard data structure, merged with other tax data, imported into a tax return, etc.).

In yet another feature, the tax preparation system may be configured as client-server system, such that the computer server accesses tax documents and converts the tax documents into a standard data structure and a client tax return system receives the tax data in the standard data structure from the computer server and imports the tax data into a tax return. Accordingly, the tax preparation system further comprises a client tax return system comprising a client computer having a computer processor, memory, and a client tax preparation software application. The client tax return system is configured to communicate with the computer server via a communication network, such as the internet and/or a private computer network. For instance, the client tax return system may be a computer owned and operated by the tax preparer, while the server computer system is operated by a tax preparation service provider. In such case, the method may further comprise the computer server uploading the merged tax data in the standard data structure to the client tax return system. The client tax return system executes the client tax preparation software application. The client tax return system receives the merged tax data in the standard data structure and automatically imports the merged tax data into a tax return for the taxpayer. In one aspect, the client tax return system may present the merged tax data to the tax preparer for review prior to importing the review and approval. After the tax preparer approves the merged tax data, the client tax return system automatically imports the merged tax data into a tax return for the taxpayer. The client tax return system may then present the tax return with the imported tax data to the tax prepare for final review prior to filing.

In still another aspect, the client tax return system may automatically import the merged tax data into a tax return for the taxpayer without review by the tax preparer. Then, the client tax return system presents the tax return with the imported tax data to the tax preparer for review. Once the tax preparer approves the tax return, the tax return may be filed with appropriate tax agency.

Another embodiment of the present invention is directed to the tax preparation system implementing any of the above-described methods for preparing a tax return. As described above, the tax preparation system comprises a computer server having a one or more computer processors, memory, a storage device and a tax preparation software application. The tax preparation system is configured to execute the tax preparation software application to perform of process for preparing an electronic tax return. In the case that the tax preparation system is an online system, the computer server comprises, or is in operable communication with, a website server which provides a website accessible by tax preparers (user) to prepare electronic tax returns. Alternatively, the tax preparation system may be a local, standalone system operating on a local computer system, such as a desktop computer, notebook computer, tablet computer, smartphone, etc.

The tax preparation system is configured to perform a process according to any of the method embodiments described herein, including, for example, a process comprising: (a) receiving a request from a tax preparer for tax data for the tax year; (b) analyzing a prior year tax return and identifying a plurality of prior year tax documents used to prepare the prior year tax return, including identifying a source and a type of document for each tax document; (c) generating a request to the taxpayer for tax documents for the tax year corresponding to the identified prior year tax documents; (d) determining if the source for each corresponding tax document supports online download of the respective corresponding tax document; (e) for each corresponding tax document available for online download: (i) requesting account credentials from the taxpayer for the source of a respective corresponding tax document; (ii) receiving the account credentials; (iii) automatically accessing the corresponding tax document from the source using the account credentials; (f) for each corresponding tax document not available for online download: (i) requesting the taxpayer to electronically transmit the corresponding tax document to the tax preparation system; (ii) receiving the corresponding tax document; (iii) processing the corresponding tax document to determine the tax data contained in the corresponding tax document; and (g) converting the corresponding tax documents into a standard data structure.

In additional aspects of the present invention, the tax preparation system may include any one or more of the additional features and aspects described herein for the method embodiments. For example, as explained above, the tax preparation system may be configured as a client-server system which further comprises a client tax return system which can communicate with the computer server via a communication network.

Another embodiment of the present invention is directed to an article of manufacture comprising a non-transitory computer readable medium embodying instructions executable by a computer to execute a process according to any of the method embodiments of the present invention for preparing an electronic tax return. For instance, the non-transitory computer readable medium embodying instructions executable by a computer may be configured to perform a method of preparing an electronic tax return, comprising: (a) receiving a request from a tax preparer for tax data for the tax year; (b) analyzing a prior year tax return and identifying a plurality of prior year tax documents used to prepare the prior year tax return, including identifying a source and a type of document for each tax document; (c) generating a request to the taxpayer for tax documents for the tax year corresponding to the identified prior year tax documents; (d) determining if the source for each corresponding tax document supports online download of the respective corresponding tax document; (e) for each corresponding tax document available for online download: (i) requesting account credentials from the taxpayer for the source of a respective corresponding tax document; (ii) receiving the account credentials; (iii) automatically accessing the corresponding tax document from the source using the account credentials; (f) for each corresponding tax document not available for online download: (i) requesting the taxpayer to electronically transmit the corresponding tax document to the tax preparation system; (ii) receiving the corresponding tax document; (iii) processing the corresponding tax document to determine the tax data contained in the corresponding tax document; and (g) converting the corresponding tax documents into a standard data structure.

In additional aspects, the article of manufacture may be further configured according to the additional aspects described herein for the tax preparation system and/or methods for preparing an electronic tax return.

It is understood that the steps of the methods and processes of the present invention are not required to be performed in the order as shown in the figures or as described, but can be performed in any order that accomplishes the intended purpose of the methods and processes.

Accordingly, the methods, systems and articles of manufacture of the present invention reduces or even eliminates the need for manual input of tax data thereby reducing the chance of human error, and also reduces the time required by a tax preparer to prepare a tax return. Moreover, the present invention reduces the computing resources required to generate and display computer screens to allow for manual input, thereby reducing the time and computing resources required to prepare an electronic tax return. The present invention also utilizes improved data structures which provide for more efficient use of computing resources, including more efficient use of the processor, memory and network communications, and improves compatibility with multiple tax preparation systems. The present invention also provides more efficient use of network communications such as the internet as it reduces the amount of communication between required between the client system and the web services due to the decrease in interactions required between the tax preparer and the tax preparation system in order to prepare a tax return. As a result, the present invention improves the functioning of the computer by providing faster and more flexible preparation, computing and generation of tax forms. Thus, the present invention improves various technologies and/or technical fields, including computerized preparation of tax returns, network computing, and user interfaces. Accordingly, the present invention is rooted in computer technology involving specific computer components, intercommunications between computing modules, data structures and logic structures which improve the operation of the computer and also improve the technologies and technical fields recited above.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant:

FIG. 7 is a screen shot of an example of a user interface generated by the tax preparation system of FIG. 1 displaying a list of tax documents accessed from a source and a request to allow the system to automatically check for updated tax documents from the source, according to one embodiment of the present invention;

FIG. 8 is a screen shot of an example of a user interface generated by the tax preparation system of FIG. 1 displaying a list of tax documents for review by a tax preparer, according to one embodiment of the present invention;

FIG. 9 is a screen shot of an example of a user interface generated by the tax preparation system of FIG. 1 displaying a tax document selected from the list of FIG. 8 for review by a tax preparer, according to one embodiment of the present invention;

FIG. 10 is a screen shot of an example of a user interface generated by the tax preparation system of FIG. 1 displaying another tax document selected from the list of FIG. 8 for review by a tax preparer, according to one embodiment of the present invention;

DETAILED DESCRIPTION OF ILLUSTRATED EMBODIMENTS

Embodiments of the present invention are directed to systems, methods and articles of manufacture for preparing a tax return for a taxpayer which automatically access tax documents from sources of tax documents, such as financial institutions at which the taxpayer has an account. The tax preparation system may be an online system which provides a website which tax preparers can access via the internet to utilize the system. The system receives a request from the tax preparer for tax data regarding a taxpayer for a particular tax year. The system analyzes a prior year tax return for the taxpayer and identifies tax documents used to prepare the prior year tax return, such as a Form W-2, Form 1099s, Form 1098s, etc. The system identifies the source of the tax documents, such as the employer, financial institution, etc., and the type of tax document. The system then generates a request to the taxpayer to access tax documents from the tax year of the tax return being prepared by the tax preparer. The request allows the taxpayer to provide account credentials for tax documents that are available for online download from the source. If a tax document is not available for online download from the source, the request allows the taxpayer to upload a copy of the tax document by uploading an image file of the tax document such as a pdf or a digital picture. The system analyzes the image file to determine the tax data contained in the tax document, such as by OCR. For tax documents available for online download, the system accesses the tax documents from the source using the account credentials provided by the taxpayer. The system then converts the tax documents into a standard data structure which can be automatically imported into a tax return. The standard data structure is a data structure that is supported by multiple tax preparation software applications for import into a tax return. so that the tax data contained in the tax documents may be imported into a tax return.

Figure 1:
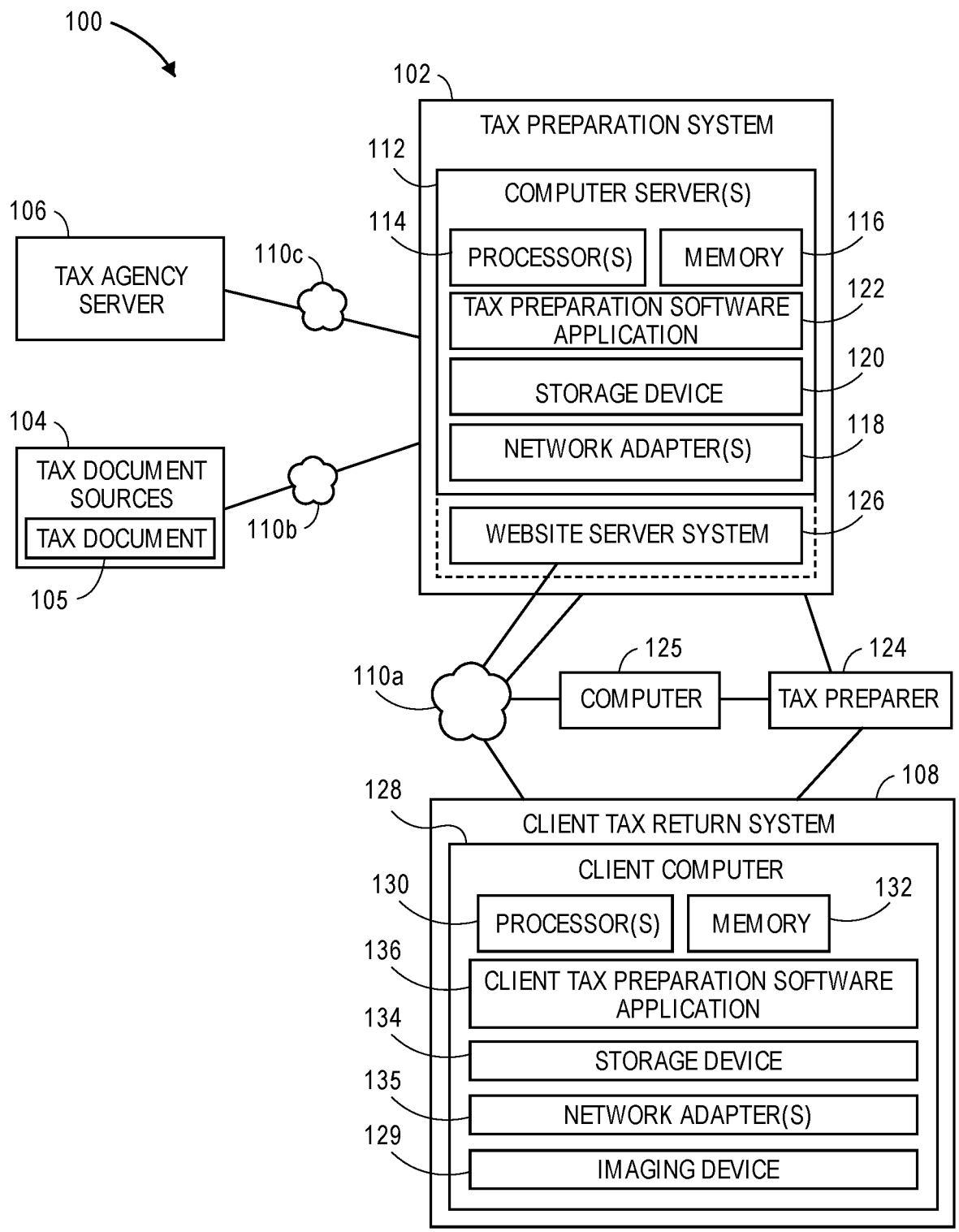
FIG. 1 illustrates an exemplary tax preparation system for preparing an electronic tax return, according to one embodiment of the present invention.

Referring to FIG. 1, in one embodiment, a block diagram of a computerized tax return system 100 for preparing a tax return is shown. The electronic tax return system 100 comprises a tax preparation system 102 which is in communication with one or more sources 104 of tax documents 105 via a communication network 110b. The tax preparation system 102 is also in communication with a tax agency server 106 via a communication network 110c. The tax preparation system 102 may be configured as a stand-alone system which accesses tax documents 105, prepares a tax return and electronically files the tax return with the appropriate tax agency; and/or it may be configured as a client-server system in which the tax preparation system 102 accesses tax documents, processes the tax documents into a standard data structure, and transmits the tax documents in a standard data structure to a client tax return system 108 via a communication network 110a, as shown in FIG. 1.

In the case that the tax preparation system 102 is a stand-alone system, the tax preparer 124 prepares and files a tax return solely using the tax preparation system 102 accessed using the tax preparer computer 125 via the communication network 110a, such as using the website via the internet. In the client-server configuration, the tax preparation system 102 is used to primarily to access tax documents and/or the tax data contained therein, and the other tasks of preparing the tax return are performed by the client tax return system 108, including importing the tax data from the tax documents into a tax return, calculating the tax return, preparing the tax return for submission to the appropriate tax agency, and/or electronically filing the tax return with the tax agency or printing the tax return for paper submission to the tax agency.

The tax preparation system 102 includes one or more computer server(s) 112 having one or more computer processors 114, memory 116, communication network adapter(s) 118, a data storage device 120, and a tax preparation software application 122. The tax preparation software application 102 is a computer software program configured to program the tax preparation system 102 to perform a process for preparing an electronic tax return for a taxpayer for a particular tax year. The tax preparation system 102 may be an online system which a tax preparer 124 can utilize by accessing a website, or a standalone system on a local computer which the tax preparer can use locally, such as a desktop computer, notebook computer, tablet computer, smartphone, etc. In the case of an online system, the computer server 112 comprises, or is in operably communication with, a website server system 126.

The website server system 126 enables a website for a tax preparer 124 using a tax preparer computer 125, or a client tax preparation system 108, to access and use the tax preparation system 102 to prepare a tax return, as described herein. The website server system 126 comprises one or more computers, servers and website servers, as well as software programming and web pages for providing a website. The website server system 126 may be part of an online tax return preparation services system for providing tax preparation services or even an online financial services system which provides a multitude of online services to clients including tax preparation services. The website server system 126 is in communication with a communication network 110a, such as the internet, so that the website is accessible over the internet, such as through the use of a web browser or a dedicated software application or app (such as the client tax preparation software application YYY) on either the tax preparer computer 125 or the client tax preparation system 108.

The tax preparation system 102, tax preparation software application 122 and/or website server system 126 may be provided by and/or operated by a tax preparation services provider, a third party service provider, a financial institution or by a third party host. For example, Intuit Inc. provides various tax preparation software applications such as TurboTax® software for Microsoft Windows® based personal computers ("PC") and Apple® Mac® computers, ProSeries® and Lacerte® tax preparation applications, and also operates the online tax preparation service Turbotax® Online.

The client tax return system 108 includes a client computer 128 having one or more computer processor(s) 130, memory 132, network adapter(s) 135, a data storage device 134 and a client tax preparation software application 136. The client computer 128 may be any suitable computer, such as a desktop computer, notebook computer, tablet computer, smartphone, etc. The client computer 128 may also include an imaging device 129, such as a digital camera, web cam, scanner, or the like. The client tax return system 108 is in operable communication with the tax preparation system 102 via the communication network 110 a. Each of the communication networks 110a, 110b and 110c may include a proprietary network, LAN, WAN, cellular network, wireless network, the internet and/or other suitable communication network. The client tax preparation software application 136 programs the client computer 128 to receive tax documents in a standard data structure from the tax preparation system 102, and prepare a tax return using the tax documents, in the standard data structure, as described herein.

Figure 2:
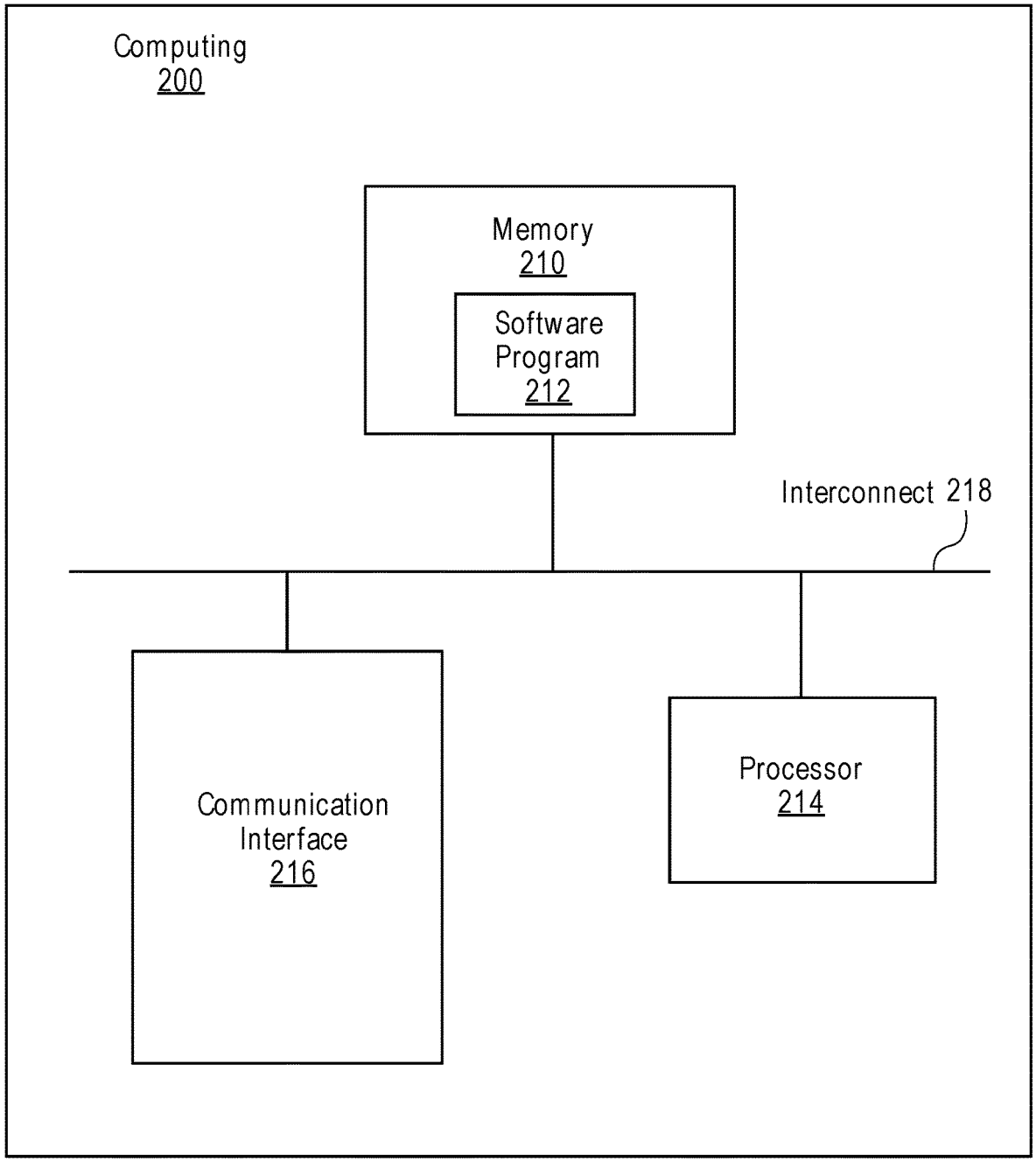
FIG. 2 is a block diagram of a computing device (computer) which may be utilized in the system of FIG. 1.

FIG. 2 generally shows a block diagram of the components of an example of a computer (computing device) 200 that may be used as the computer server(s) 112, the tax preparer computer 125 and/or the client computer of the tax return system 100 of FIG. 1. The computer 200 includes memory 210, an application software program 212, a processor or controller 214 to execute the application software 212, a network or communications interface 216, e.g., for communications with a network or interconnect 218 between the components. The memory 210 may be or include one or more of cache, RAM, ROM, SRAM, DRAM, RDRAM, EEPROM, SDRAM and other types of volatile or non-volatile memory capable of storing data. The processor unit 214 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 218 may include a system bus, LDT, PCI, ISA, or other types of buses, and the communications or network interface may, for example, be an Ethernet interface, a Frame Relay interface, or other interface. The network interface 216 may be configured to enable a system component to communicate with other system components across a network which may be a wireless network or various other communication networks. It should be noted that one or more components of computer 200 may be located remotely and accessed via a network. Accordingly, the system configuration provided in FIG. 2 is provided to generally illustrate how embodiments may be configured and implemented.

Figure 3:
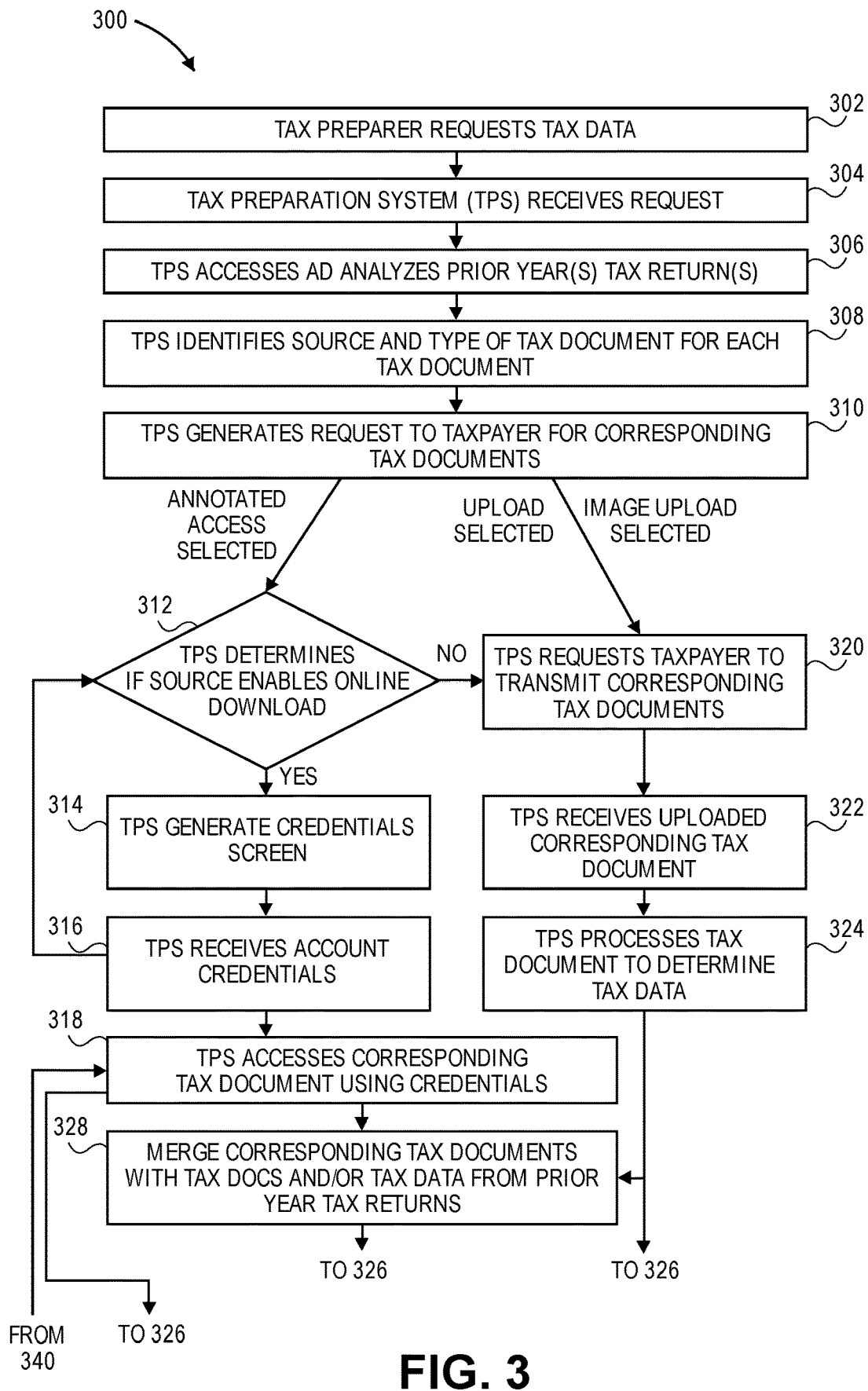
FIG. 3 is a flow chart of a process performed by the tax preparation system of FIG. 1 to prepare an electronic tax return, according to one embodiment of the present invention.
Figure 3:
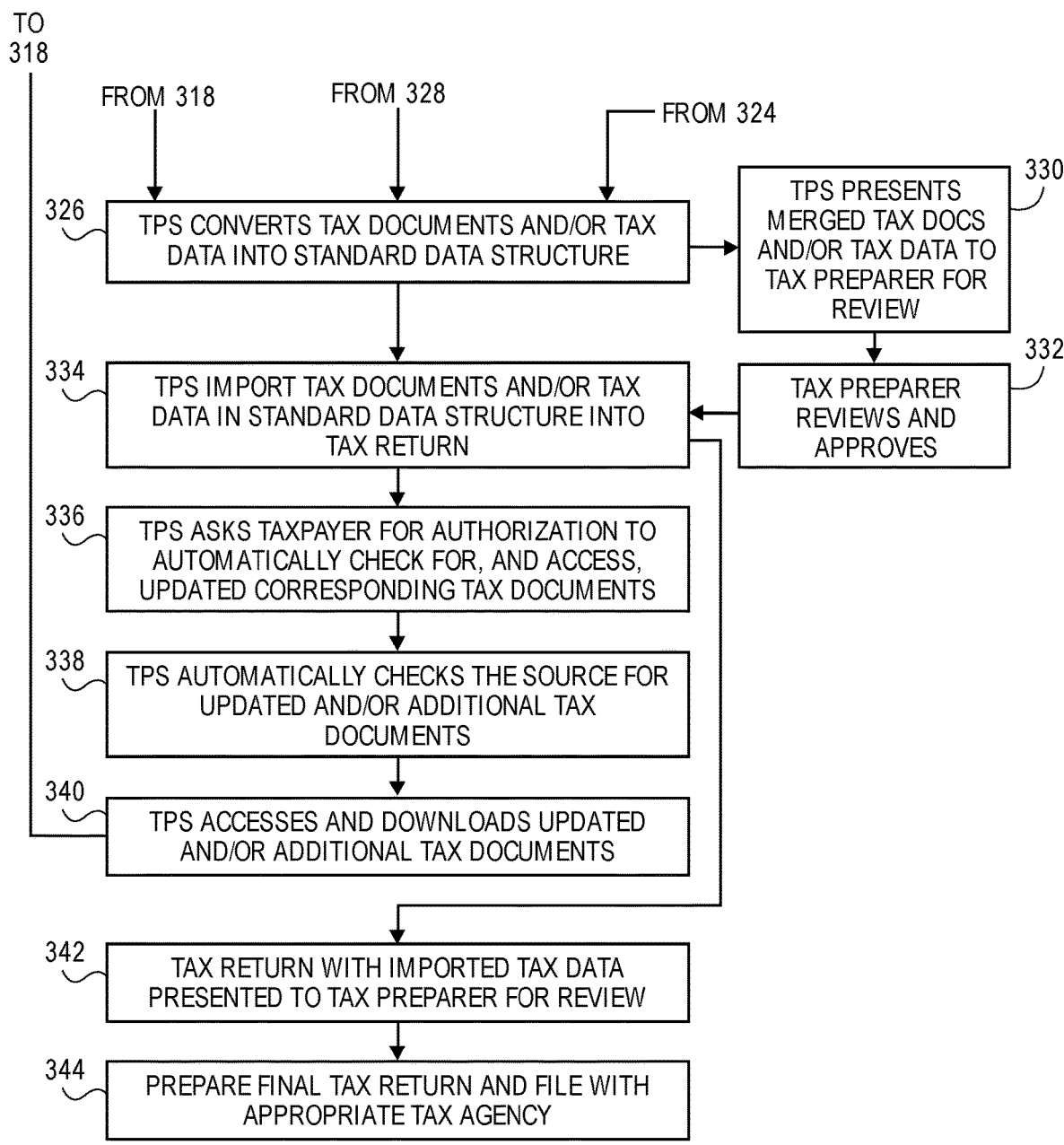

Turning now to FIG. 3, a flow chart shown a method 300 for preparing a tax return for a taxpayer for a particular tax year using the tax return system 100 according to one embodiment of the present invention is illustrated. At step 302, the tax preparer 124 requests (a request includes simply prompting the tax preparation system 102 to provide) tax data using the tax preparation system 102 regarding the taxpayer for the particular tax year for which a tax return is being prepared. If the tax preparer 124 is using the tax preparer computer 125 (as opposed to the client tax return system 108), the tax preparer 124 may log into the tax preparation system 102 via the communication network 110a (e.g., using the website) and input the request. If the tax preparer 124 is using the client tax return system 108, the tax preparer 124 inputs the request into the client tax return system 108, which transmits the request to the tax preparation system 102 via the communication network 110a. The request may be more or less explicit, such as an implicit instruction when the tax preparer 124 simply starts or continues a tax return on the tax preparation system 102 or on the client tax return system 108, or an explicit instruction in which the tax preparer 124 selects to send a request to the tax preparation system 102.

At step 304, the tax preparation system 102 receives the request (e.g., a prompt) for tax data from the tax preparer 124. At step 306, the tax preparation system 102 accesses one or more prior year(s) tax return(s) for the taxpayer. The tax preparation system 102 may have a database of prior years tax returns, such as prior years tax returns previously prepared on the tax preparation system 102, and/or the tax preparation system may access prior years tax returns from an outside source, such as another tax return preparation service, an outside tax return database provider, or even a tax agency. At step 308, the system 102 analyzes the tax return(s) for the taxpayer and identifies tax documents which were utilized to prepare the tax return, such as Forms 1098, 1099, W-2, K-1, etc. At step 308, for each identified tax document, the system 102 identifies the source of the tax document (e.g., the employer, partnership, financial institution, etc., which issued the tax document) and/or the type of tax document (e.g., 1098, 1099, W-2, K-1, etc.). The system 102 may obtain the source information and type of tax document from the tax returns itself, including the schedules and worksheets that are a part of the tax returns, and/or from data records stored along with the tax returns which include copies of the tax documents and/or data reflecting the contents of the tax documents.

At step 310, the tax preparation system 102 generates a request to the taxpayer to access corresponding tax document(s) for the tax year of the tax return currently being prepared "Corresponding tax documents) are tax documents which correspond to the tax documents identified in step 308. As defined above, the term "correspond" or "corresponding" with respect to a tax documents means the same type of document and/or from the same source but for a different tax year. The request is displayed to the taxpayer. As an example, for an identified tax document comprising a 1099-DIV from Acme Brokerage for the 2015 tax year, in preparing a tax return for the 2016 tax year, a corresponding tax document is a 1099-DIV and/or which is from Acme Brokerage, or from another brokerage, for the 2016 tax year.

Figure 4:
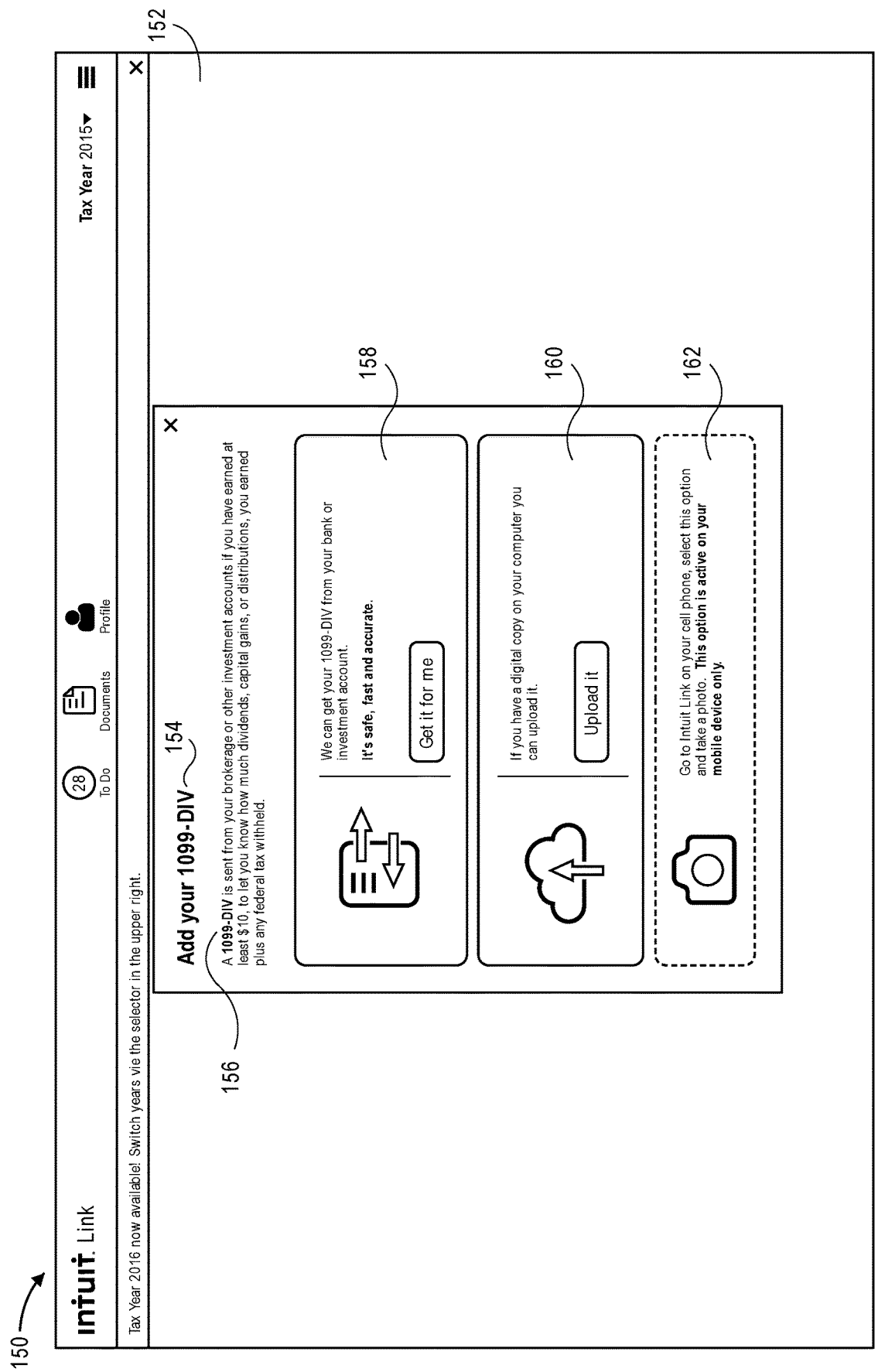
FIG. 4 is a screen shot of an example of a user interface generated by the tax preparation system of FIG. 1 for requesting a tax document from a taxpayer, according to one embodiment of the present invention.

Turning to FIG. 4, an example of a request 150 to a taxpayer to access a tax document is shown in the form of a user interface 152 generated and displayed to the taxpayer by the tax preparation system 102. The user interface 152 includes a name 154 of the type of tax document being requested and also a description 156 of the type of tax document being requested. The request 150 also includes three access selections 156, 158 and 160 for the taxpayer to select from to provide access to the requested tax document. In this example request 150, the system 102 has only identified the type of tax document and not the source. If the system 102 also identified the source, then the request 150 can include the name of the source and the access selection 156 can ask the taxpayer to allow the system 102 to access the tax document directly from identified source.

The access selection 156 is an automated access selection 158 which asks the taxpayer to allow the system 102 to automatically access the tax document directly from a source. The access selection 160 is an upload selection 160 which asks the taxpayer to upload the tax document from the taxpayer's computer. The access selection 162 is an image upload selection 162 which asks the taxpayer to take a photo the tax document and upload the photo. The access selection 160 is active only if the taxpayer is viewing the request 150 on a mobile device, such as a smartphone.

Figure 5:
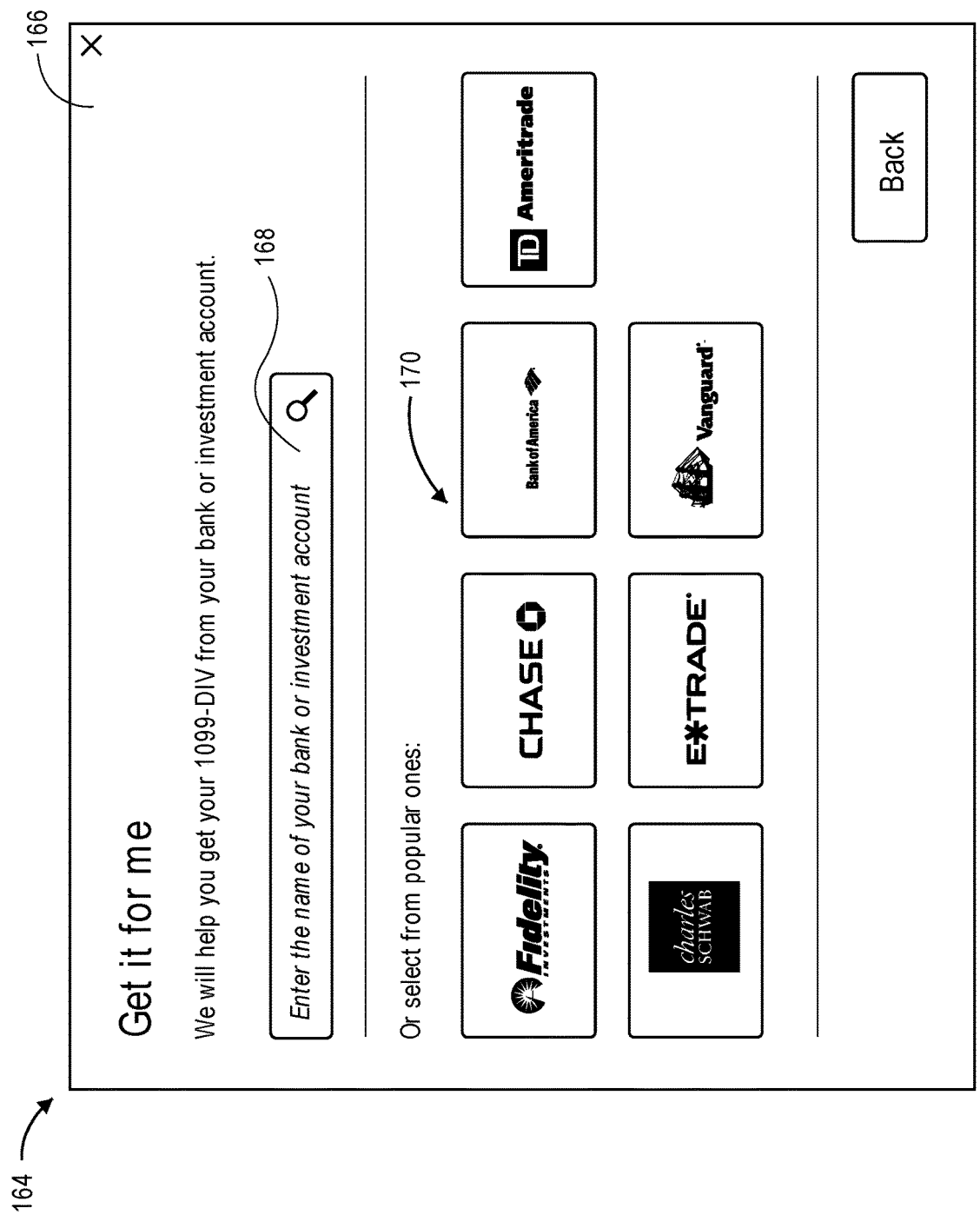
FIG. 5 is a screen shot of an example of a user interface generated by the tax preparation system of FIG. 1 requesting for a taxpayer to enter a source for a tax document, according to one embodiment of the present invention.

At step 312, if the user selects the automated access selection 158, the tax preparation system 102 determines if the source of the corresponding tax document enables online download of the corresponding tax document. For instance, the system 102 may generate and display a source selection screen 164 as shown in FIG. 5, which includes a user interface 166. The user interface 166 includes a text field box 168 into which the taxpayer can input the name of a source into, and/or a plurality of source selections 170 which includes popular sources for the identified type of document which the system 102 knows enable online download.

If the taxpayer inputs a name into the text field box 168, the system 102 searches a database of sources to find the name of a source which matches the name and determines if such matching source enables online download.

Figure 6:
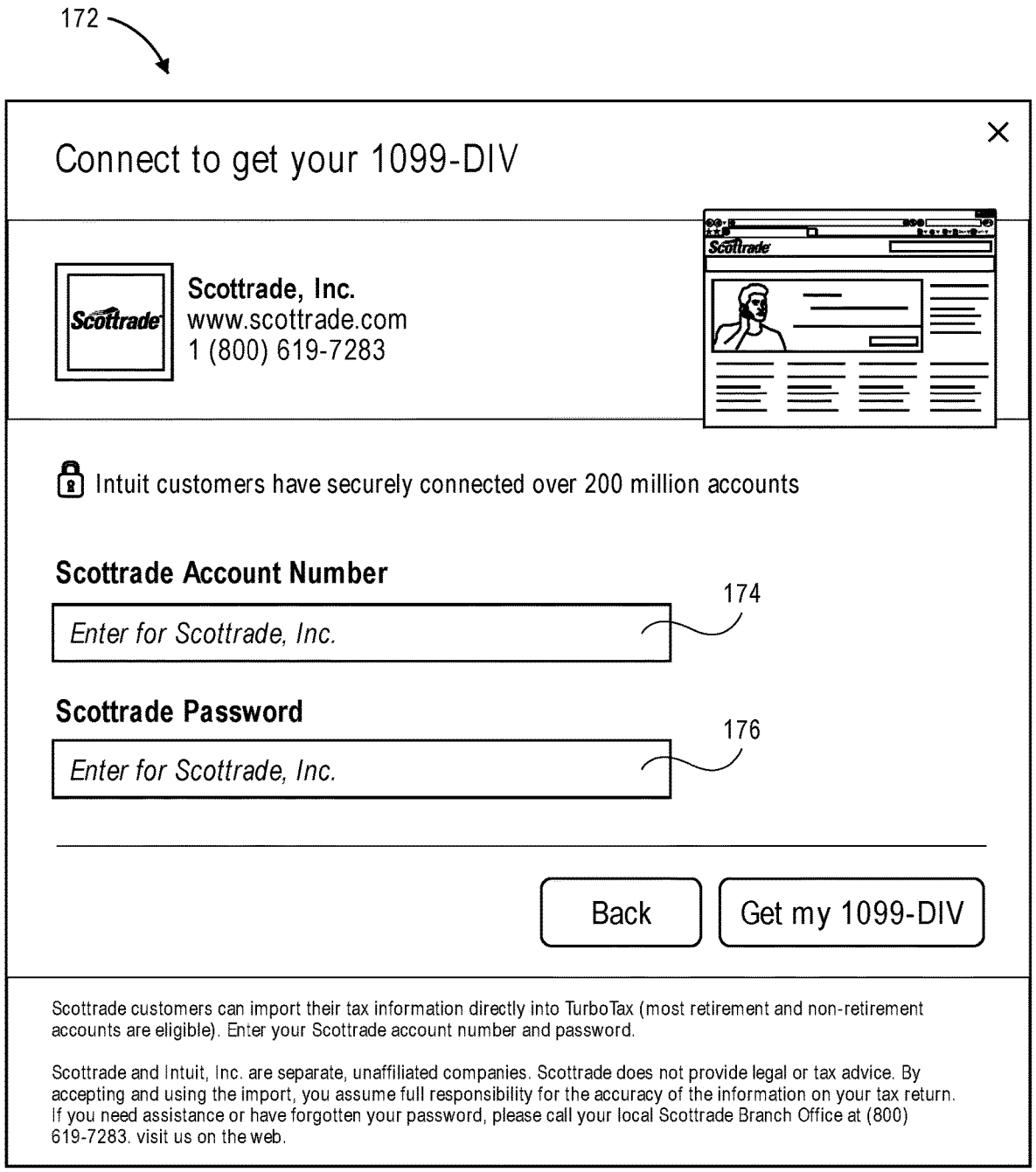
FIG. 6 is a screen shot of an example of a user interface generated by the tax preparation system of FIG. 1 requesting a taxpayer to enter account credentials for a source for a tax document, according to one embodiment of the present invention.

If the source entered or selected by the taxpayer enables online download, at step 314, the system 102 generates and displays a credentials screen 170 as shown in FIG. 6. The credentials screen 170 includes a user interface 172 which allows the taxpayer to enter the taxpayer's credentials, such as a username or account number and password, for online access to the taxpayer's account at the source. The user interface 172 includes a username or account number text field box 174 for entering the username or account number, and a password text field box 176 for entering the password.

At step 316, the tax preparation system 102 receives the account credentials entered by the taxpayer and saves the account credentials in the storage device 120. The stored account credentials may be encrypted for security. At step 318, the system 102 automatically accesses the corresponding tax document from the source using the account credentials. The system 102 is configured to log into the user's online account, navigate the website of the source, find the corresponding tax document, and download and save it to the system 102. The system 102 may also access and download other tax documents available for download from the source via the taxpayer's account which may or may not correspond to tax documents identified in the prior tax returns. For instance, the system 102 may access and download a 1099-INT from a brokerage firm which is a corresponding tax document, and also access and download a 1099-DIV using the same online account of the taxpayer. The system 102 may display a text description of the accessed tax documents and/or an image of the tax documents and/or a "display image" selection which the taxpayer can select to display an image of the tax documents. Referring to FIG. 7, an example of an accessed tax document screen 176 is shown. The corresponding tax document screen 176 includes a description 180 of the corresponding tax document and a description of two other tax documents 182a and 182b available on the same online account. The description text 180, 182a and 182b may be hyperlinks which can be selected to view the image of the selected tax document. A delete icon 184 may also be associated with each of the tax documents 180, 182a, 182b which can be selected to delete the associated tax document from the system 102 such that it is not utilized in preparing the tax return for the taxpayer. The system 102 may repeat steps 312-318 for each of the corresponding tax document having a respective source which enables online download.

If the taxpayer selects the upload selection 160 or the image upload selection 162, or the corresponding tax documents are not available for online download, at step 320, the tax preparation system 102 requests the taxpayer to electronically transmit the corresponding tax documents to the system 102. For uploading the corresponding tax document, the system 102 may display a file selection user interface which allows the taxpayer to browse the files and file folders on the taxpayer's computer, a connected storage device or an accessible database, and then select the desired data file for the corresponding tax document. For the image upload selection 162, the system 102 allows the taxpayer to take a photo of the corresponding tax document and upload the photo to the system 102.

At step 322, the system 102 receives the uploaded corresponding tax document, as either a digital document file, or a digital photo. At step 324, if necessary, the system 102 processes the corresponding tax document in the digital file format to determine the tax data contained in the corresponding tax document. For a digital photo, the system 102 may perform an optical character recognition algorithm and then parse the photo, as known in the art, to determine the tax data. For a digital document file, the system 102 may identify the tax data using any of the same methods as for the digital photo, and/or by utilizing a standard template for the type of document for the particular digital document file.

At step 326, the tax preparation system 102 converts the corresponding tax documents into a standard data structure. The standard data structure is a data structure that is supported by multiple tax preparation software applications for import into a tax return, such that the tax data contained in the tax documents may be imported into a tax return. The system 102 may utilize a standard data structure for each type of tax document, and convert the tax documents into the standard data structure for the respective type of document. For example, a data record for a 1099-INT may be have particular standard 1099-INT data structure for which the system is configured to import the 1099-INT data record into a tax return. In this way, each tax preparation software application can be configured to be compatible with the standard data structure for import into a tax return.

Alternatively, at step 328, the tax preparation system may first merge the corresponding tax documents with tax documents and/or tax data obtained from the prior tax return(s). For instance, the prior tax return(s) may utilize tax documents and tax data which does not typically change from year to year, such as taxpayer identification information (e.g., name, address, phone number(s), social security number), spouse identification information (e.g., name, social security number), dependent information (e.g., names, birthdates, social security numbers), etc. Then, the method 100 proceeds to step 324 in which the merged tax data is converted into a standard data structure.

Figure 9:
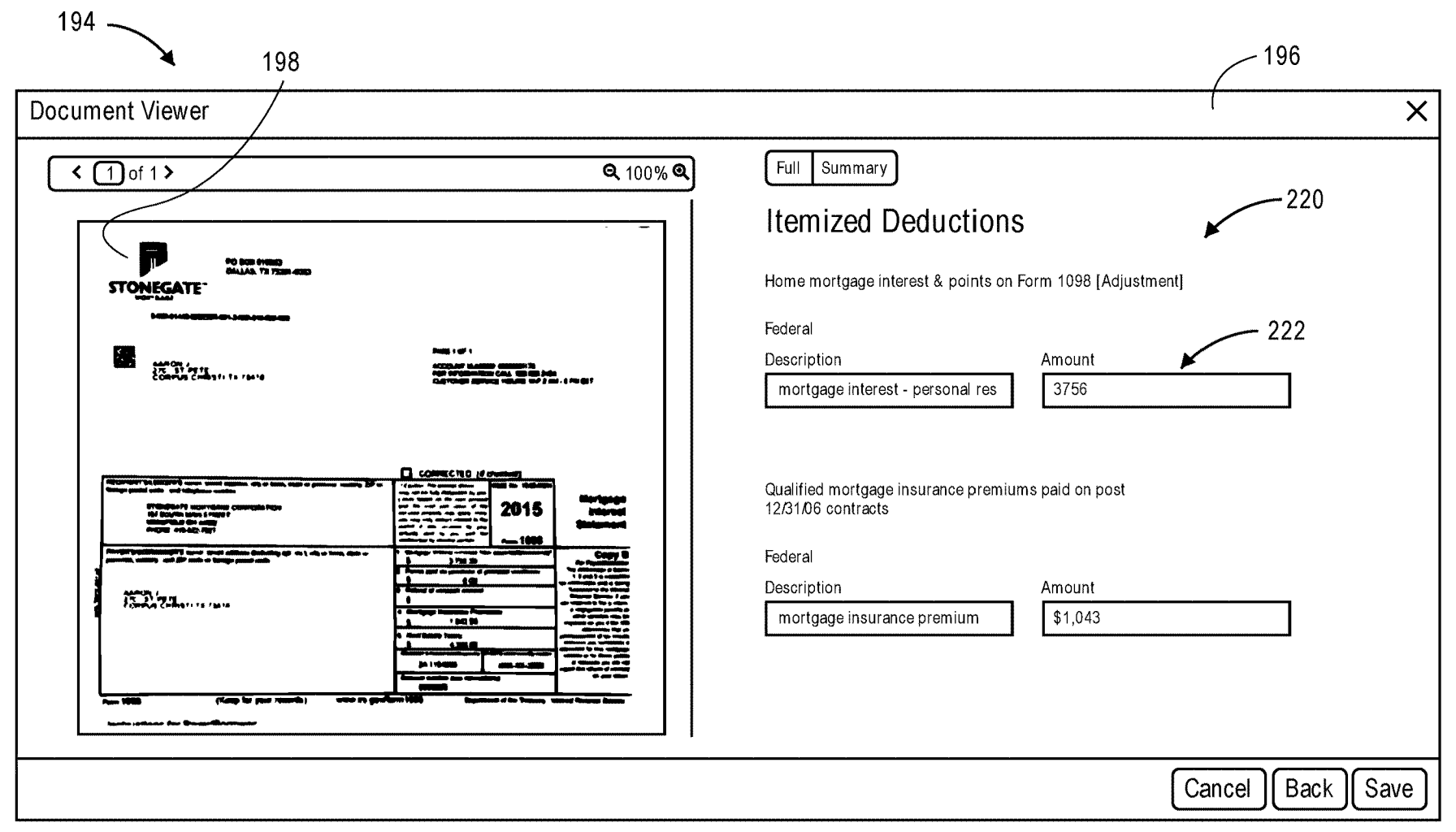
Figure 10:
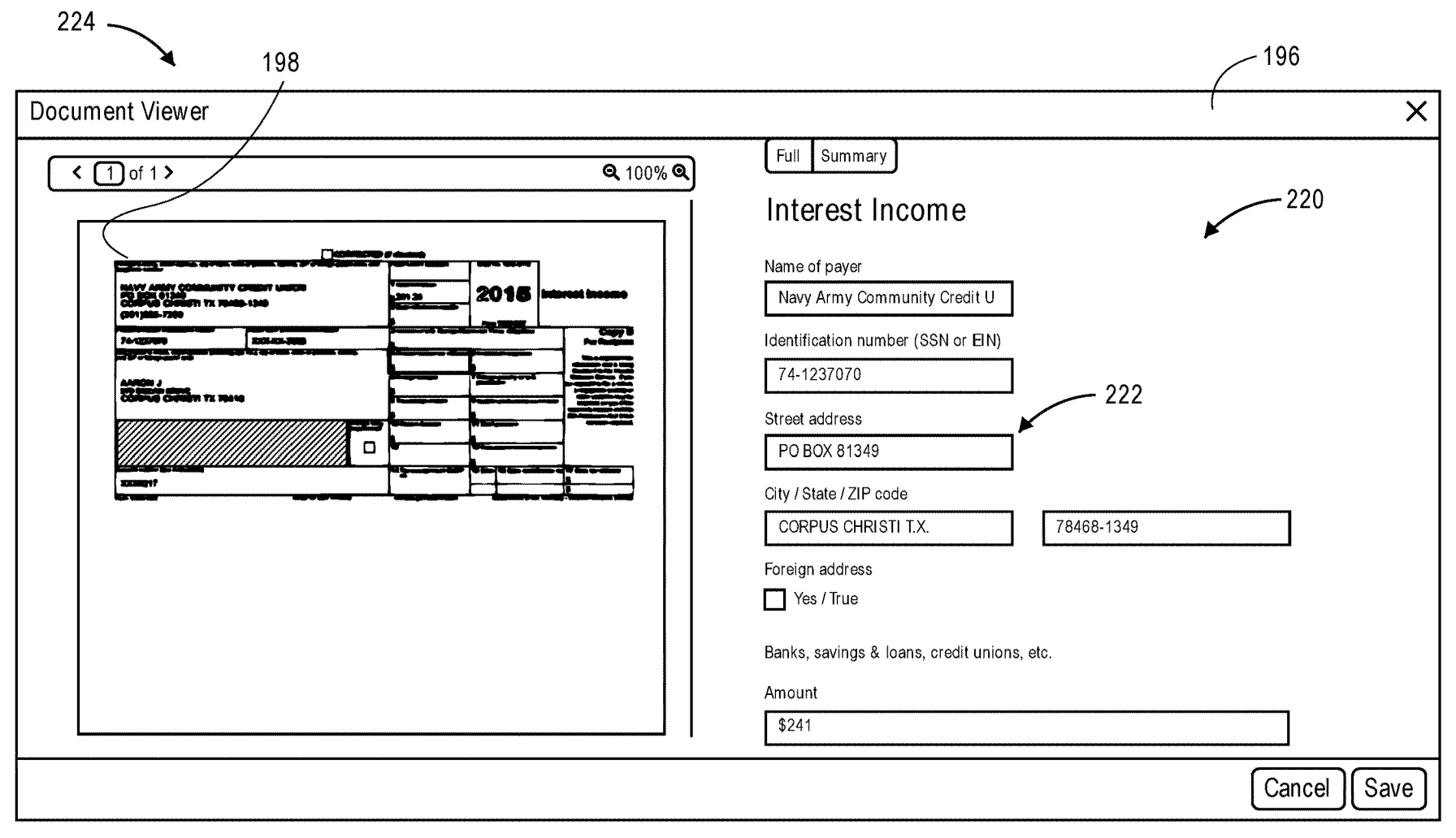

As optional steps in the method 300, at step 330, the merged tax documents and/or tax data in the standard data structure are presented to the tax preparer 124 for review. In the stand-alone tax preparation system 102 configuration, the tax preparation system 102 presents the merged tax documents and/or tax data to the tax preparer 124. In the client-server configuration, the tax preparation system 102 transmits the merged tax documents and/or tax data in the standard data structure to the client tax return system 108, and the client tax return system 108 presents the merged tax documents and/or tax data to the tax preparer. At step 332, the tax preparer 124 reviews the tax documents and/or tax data, makes corrections if necessary, and then gives approval to the tax preparation system 102. The method 300 then proceeds to step 334. Turning to FIG. 8, an example of a tax document review screen 186 is shown. The tax document review screen 186 includes a user interface 188 having a list 190 list includes a description of each tax document, the source of the tax document (e.g., "upload" from an online source), a date for the last update of the tax document, and an action selection 192. The action selection allows the tax preparer to select the associated tax document for review and/or import. FIG. 9 illustrates a tax document review screen 194 for a Form 1098. The tax document review screen 194 has a user interface 196 which displays the image 198 of the tax document and a tax data import page 220. The tax data import page 220 shows the tax data 222 from the tax document and also a description of how it is to be imported into the tax return. The tax data 222 is displayed in editable text fields which allow the tax preparer to correct or adjust the values in the text fields, as required. FIG. 10 illustrates a tax document review screen 224 for a Form 1099-INT having the same elements as the form 1098.

At step 334, the tax documents and/or tax data in the standard data structure are imported into a tax return. In one aspect, the tax preparation system 102 imports the tax data and/or tax documents in the standard data structure into a tax return for the taxpayer. In the client-server configuration, the tax preparation system 102 transmits the tax data and/or tax documents in the standard data structure to the client tax return system 108, and the client tax return system 108 imports the tax data and/or tax documents in the standard data structure into the tax return.

In another aspect, still referring to the flow chart of FIG. 3, the system 100 and method 300 may be configured to automatically access updated tax documents. At step 336, the tax preparation system 102 asks the taxpayer for authorization to periodically check for, and access, updated corresponding tax documents from the respective sources using the account credentials. For example, referring to FIG. 7, the accessed tax document screen 176 may also include a selection, such as a check box, that the taxpayer can select to authorize the tax preparation system 102 to automatically, periodically check for updates to the corresponding tax documents 180 and other tax documents 182a and 182b listed on the user interface 178, as well as any additional other tax documents which may become available at the time the system 102 performs a periodic check. As shown in the accessed tax document screen 176, the step 336 may be performed at the same time as the tax preparation system 102 receives the account credentials, i.e., at step 316, or at any other suitable time within the method 300. If the system 102 received authorization to periodically check for updates, then a step 338, the system 102 automatically checks the source for updates using the account credentials of the taxpayer. If there is an updated tax document and/or an additional tax document not previously accessed, then at step 340, the system 102 accesses and downloads the tax documents. The updated and/or additional tax documents are then processed the same as the corresponding tax documents at step 318. The tax preparation system 102 performs the steps 338-340 periodically, such as once a day, once a week, once a month, or other suitable frequency and timing.

Figure 11:
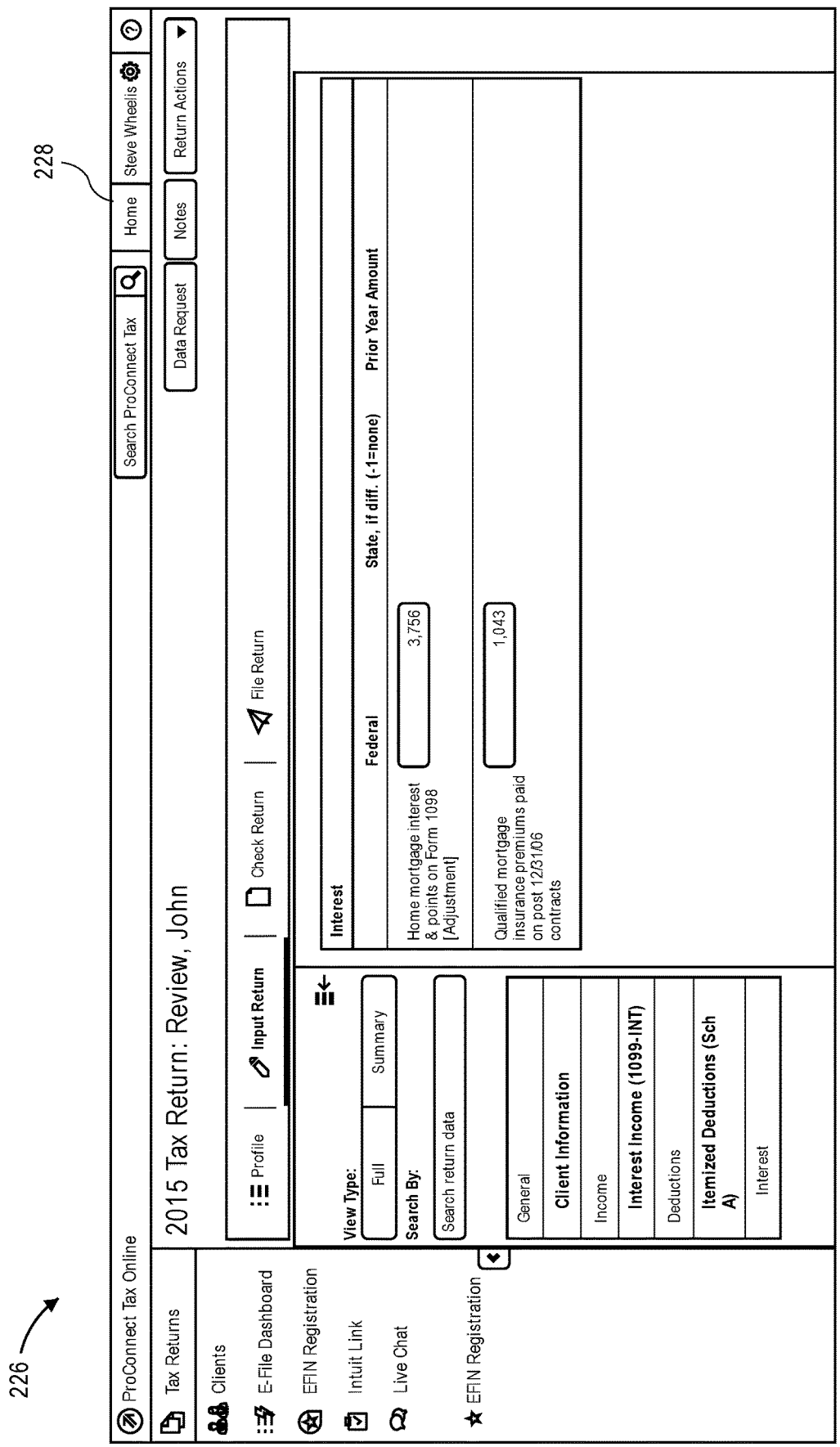
FIG. 11 is a screen shot of an example of a user interface generated by the tax preparation system of FIG. 1 displaying tax data imported into a tax return for review by a tax preparer, according to one embodiment of the present invention.

At step 342, the tax return with the tax data in the standard data structure imported into the tax return is presented to the tax preparer 124 for review and approval. In the stand-alone tax preparation system configuration, the tax preparation system 102 presents the tax return to the tax preparer 124. In the client-server configuration, the client tax return system 108 presents the tax return to the tax preparer 124. FIG. 11 shows an example of a tax return review screen 226 having a user interface 228. The user interface 228 includes tax return navigation functions which allow the tax preparer to navigate the entire tax return to review all of the tax data entered into the tax return. The example of the tax return review screen 226 shows a page for reviewing the tax data from the Form 1098 shown in FIG. 9.

Finally, upon receiving approval from the tax preparer 124, at step 344, the tax preparation system 102 or the client tax return system 108, as the case may be, prepares the tax return for filing. For electronic filing, a tax return data file in the appropriate data format is prepared and electronically transmitted to the appropriate tax agency, or to a third party e-filing service which transmits the tax return data file to the appropriate tax agency. For a paper filing, a printable tax return is generated and the tax preparer can then print and mail the completed tax return to the appropriate tax agency.

The algorithms, processes, and method embodiments described herein, may also be embodied in, or readable from, a computer-readable medium (computer program carrier), e.g., one or more of the fixed and/or removable data storage data devices and/or data communications devices connected to a computer, including a non-transitory computer medium having instructions that when executed by a computer perform the described methods. The computer program carrier is readable by a computer and embodies instructions executable by the computer to perform the method steps of programming a computer to perform the methods implemented by the system 100 and/or its components, as described herein. Carriers may be, for example, magnetic storage medium, optical storage medium and magneto-optical storage medium. Examples of carriers include, but are not limited to, a floppy diskette, a memory stick or a flash drive, a hard drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially.

Accordingly, embodiments are intended to exemplify alternatives, modifications, and equivalents that may fall within the scope of the claims.

What is claimed is:

1. A computer system implemented method for preparing an electronic tax return for a tax year, comprising:
   a tax preparation system executing a tax preparation software application, the tax preparation system including a computer server having a computer processor, memory, a storage device for reading and writing tax data to the storage device, the tax preparation software application configured to program the tax preparation system to perform a process to prepare an electronic tax return, comprising:
   receiving a request from a tax preparer for tax data regarding a taxpayer for the tax year;
   analyzing a prior year tax return for the taxpayer and identifying a plurality of prior year tax documents used to prepare the prior year tax return, including identifying a source and a type of document for each tax document;
   identifying one or more sources having a plurality of current year tax documents available for online download based on the analyzing of the prior year tax return;
   generating a request to the taxpayer to access current year tax documents for the tax year corresponding to the identified prior year tax documents, wherein the request indicates a plurality of current year tax documents each corresponding to respective ones of the plurality of prior year tax documents;
   displaying the request through a user interface, the displaying indicating one of the plurality of current year tax documents corresponding to the respective one of the plurality of prior year tax documents;
   presenting the user interface including a current year tax document, a text input box for entering the source information and a plurality of source selection buttons each respectively including a name of a popular source known by the tax preparation system to have the current year tax document available for online download;
   in response to receiving source information in the text input box, searching the source information against a database of sources within the tax preparation system and matching the source information with a known source having current year tax documents available for online download;
   in response to matching the source name with the known source or receiving a selection from the plurality of source selection buttons:
     requesting account credentials from the taxpayer for the source of the current year tax document identified by the source information or the selection from the plurality of source selection buttons;
     receiving the account credentials by the tax preparation system; and
     automatically accessing the current year tax document from the source of the current year tax document identified by the source information or the selection from the plurality of source selection buttons using the account credentials received from the taxpayer;
     storing a current version of the current year tax document;
     displaying the request through the user interface, the displaying indicating a remaining one of the plurality of current year tax documents corresponding to the respective one of the plurality of prior year tax documents;
   in response to failing to match the source name with a source having current year tax documents available for online download included in the database of sources:
     requesting an electronic form of the current year tax document from the taxpayer through image capture or file upload;
     receiving the electronic form of the current year tax document; and
     parsing the current year tax document using optical character recognition and storing the parsed current year tax document according to a standard template for the current year tax document;
   converting the automatically accessed current year tax document or the parsed current year tax document into a tax document specific standard data structure corresponding to the current year tax document, wherein the tax document specific standard data structure is formatted for a tax return and supported by multiple tax preparation software applications; and
   updating the automatically accessed current year tax document by:
     in response to the automatically accessing, requesting and receiving authorization from the taxpayer to periodically check for and automatically access an updated version of the current year tax document;

using the account credentials to access the updated version of the current year tax document;

converting the updated version of the current year tax document into the tax document specific standard data structure corresponding to the current year tax document;

storing the updated version of the current year tax document;

deleting the current version of the current year tax document from the tax preparation system;

generating an updated request to the taxpayer to access current year tax documents, wherein the request indicates a plurality of current year tax documents each corresponding to respective ones of the plurality of prior year tax documents and not including the updated version of the current year tax document; and displaying the updated request through the user interface, the displaying indicating a remaining one of the plurality of current year tax documents corresponding to the respective one of the plurality of prior year tax documents.

2. The method of claim 1, further comprising:

merging tax data in the prior year tax return with tax data from the current year tax documents; and converting the merged tax data into the tax document specific standard data structure; and automatically importing the tax data in the standard data structure into a tax return for the taxpayer.

3. The method of claim 2, wherein the system presents the merged tax data to the tax preparer and receives approval of the merged tax data prior to automatically importing the tax data into a tax return.

4. The method of claim 1, further comprising:

merging the tax data in the prior year tax return with the tax data from the current year tax documents; and converting the merged tax data into the tax document specific standard data structure; and automatically importing the tax data in the standard data structure into a tax return for the taxpayer;

presenting the tax return with the tax data imported into the tax return to the tax preparer for review.

5. The method of claim 1, wherein the tax preparation system comprises a client tax return system having a computer processor, memory and a client tax preparation software application, the client tax preparation software application, the client tax return system in network communication with the computer server, and the method further comprises:

the tax preparation system merging tax data in the prior year tax return with tax data from the current year tax documents;

the tax preparation system converting the merged tax data into the tax document specific standard data structure;

the tax preparation system uploading the merged tax data in the standard data structure to the client tax return system;

the client tax return system presenting the merged tax data in the tax document specific standard data structure to a tax preparer for review;

the client tax return system receiving approval of the merged tax data;

after receiving approval of the merged tax data, the client tax return system automatically importing the merged tax data into a tax return for the taxpayer; and the client tax return system presenting the tax return with the tax data imported into the tax return to the tax preparer for review.

6. The method of claim 1, wherein the tax preparation system comprises a client tax return system having a computer processor, memory and a client tax preparation software application, the client tax preparation software application, the client tax return system in network communication with the computer server, and the method further comprises:

the tax preparation system merging tax data in the prior year tax return with tax data from the current year tax documents;

the tax preparation system converting the merged tax data into the tax document specific standard data structure;

the tax preparation system uploading the merged tax data in the tax document specific standard data structure to the client tax return system;

the client tax return system automatically importing the merged tax data into a tax return for the taxpayer; and the client tax return system presenting the tax return with the tax data imported into the tax return to the tax preparer for review.

7. A system for preparing an electronic tax return for a taxpayer, comprising:

a tax preparation system including a server computer having a computer processor, memory, a storage device for reading and writing tax data to the storage device, and a tax preparation software application, the tax preparation software application configured to program the computer to perform a process for preparing an electronic tax return for a taxpayer, comprising;

receiving a request from a tax preparer for tax data for the tax year;

analyzing a prior year tax return and identifying a plurality of prior year tax documents used to prepare the prior year tax return, including identifying a source and a type of document for each tax document;

identifying one or more sources having a plurality of current year tax documents available for online download based on the analyzing of the prior year tax return;

generating a request to the taxpayer to access current year tax documents for the tax year corresponding to the identified prior year tax documents, wherein the request indicates a plurality of current year tax documents each corresponding to respective ones of the plurality of prior year tax documents;

displaying the request through a user interface, the displaying indicating one of the plurality of current year tax documents corresponding to the respective one of the plurality of prior year tax documents;

presenting the user interface including a current year tax document, a text input box for entering the source information and a plurality of source selection buttons each respectively including a name of a popular source known by the tax preparation system to have the current year tax document available for online download;

in response to receiving source information in the text input box, searching the source information against a database of sources within the tax preparation system and matching the source information with a known source having current year tax documents available for online download;

in response to matching the source name with the known source or receiving a selection from the plurality of source selection buttons:

requesting account credentials from the taxpayer for the source of the current year tax document identified by the source information or the selection from the plurality of source selection buttons;

receiving the account credentials by the tax preparation system; and automatically accessing the current year tax document from the source of the current year tax document identified by the source information or the selection from the plurality of source selection buttons using the account credentials received from the taxpayer;

storing a current version of the current year tax document;

displaying the request through the user interface, the displaying indicating a remaining one of the plurality of current year tax documents corresponding to the respective one of the plurality of prior year tax documents;

in response to failing to match the source name with a source having current year tax documents available for online download included in the database of sources:

requesting an electronic form of the current year tax document from the taxpayer through image capture or file upload;

receiving the electronic form of the current year tax document; and parsing the current year tax document using optical character recognition and storing the parsed current year tax document according to a standard template for the current year tax document;

converting the automatically accessed current year tax document or the parsed current year tax document into a tax document specific standard data structure corresponding to the current year tax document, wherein the tax document specific standard data structure is formatted for a tax return and supported by multiple tax preparation software applications; and updating the automatically accessed current year tax document by:

in response to the automatically accessing, requesting and receiving authorization from the taxpayer to periodically check for and automatically access an updated version of the current year tax document;

using the account credentials to access the updated version of the current year tax document;

converting the updated version of the current year tax document into the tax document specific standard data structure corresponding to the current year tax document;

deleting the current version of the current year tax document from the tax preparation system;

generating an updated request to the taxpayer to access current year tax documents, wherein the request indicates a plurality of current year tax documents each corresponding to respective ones of the plurality of prior year tax documents and not including the updated version of the current year tax document; and displaying the updated request through the user interface, the displaying indicating a remaining one of the plurality of current year tax documents corresponding to the respective one of the plurality of prior year tax documents.

8. The system of claim 7, wherein the process further comprises:

merging the tax data in the prior year tax return with the tax data from the current year tax documents; and converting the merged tax data into the tax document specific standard data structure; and automatically importing the tax data in the tax document specific standard data structure into a tax return for the taxpayer.

9. The system of claim 8, wherein the system presents the merged tax data to the tax preparer and receives approval of the merged tax data prior to automatically importing the tax data into a tax return.

10. The system of claim 7, wherein the process further comprises:

merging the tax data in the prior year tax return with the tax data from the current year tax documents; and converting the merged tax data into the tax document specific standard data structure; and automatically importing the tax data in the tax document specific standard data structure into a tax return for the taxpayer;

presenting the tax return with the tax data imported into the tax return to the tax preparer for review.

11. The system of claim 7, further comprising a client tax return system having a computer processor, memory and a client tax preparation software application, the client tax return system in network communication with the computer server, and wherein the process further comprises:

the tax preparation system merging tax data in the prior year tax return with tax data from the current year tax documents;

the tax preparation system converting the merged tax data into the tax document specific standard data structure;

the tax preparation system uploading the merged tax data in the tax document specific standard data structure to the client tax return system;

the client tax return system presenting the merged tax data in the tax document specific standard data structure to a tax preparer for review;

the client tax return system receiving approval of the merged tax data;

after receiving approval of the merged tax data, the client tax return system automatically importing the merged tax data into a tax return for the taxpayer; and the client tax return system presenting the tax return with the tax data imported into the tax return to the tax preparer for review.

12. The system of claim 7, further comprising a client tax return system having a computer processor, memory and a client tax preparation software application, the client tax return system in network communication with the computer server, and wherein the process further comprises:

the tax preparation system merging tax data in the prior year tax return with tax data from the current year tax documents;

the tax preparation system converting the merged tax data into the tax document specific standard data structure;

the tax preparation system uploading the merged tax data in the tax document specific standard data structure to the client tax return system;

the client tax return system automatically importing the merged tax data into a tax return for the taxpayer; and the client tax return system presenting the tax return with the tax data imported into the tax return to the tax preparer for review.

13. An article of manufacture comprising a non-transitory computer program carrier readable by a computer and embodying instructions executable by the computer to perform a method for preparing an electronic tax return for a taxpayer, the method comprising:

receiving a request from a tax preparer for tax data regarding a taxpayer for the tax year;

analyzing a prior year tax return for the taxpayer and identifying a plurality of prior year tax documents used to prepare the prior year tax return, including identifying a source and a type of document for each tax document;

identifying one or more sources having a plurality of current year tax documents available for online download based on the analyzing of the prior year tax return;

generating a request to the taxpayer to access current year tax documents for the tax year corresponding to the identified prior year tax documents, wherein the request indicates a plurality of current year tax documents each corresponding to respective ones of the plurality of prior year tax documents;

displaying the request through a user interface, the displaying indicating one of the plurality of current year tax documents corresponding to the respective one of the plurality of prior year tax documents;

presenting the user interface including a current year tax document, a text input box for entering the source information and a plurality of source selection buttons each respectively including a name of a popular source known by the tax preparation system to have the current year tax document available for online download;

in response to receiving source information in the text input box, searching the source information against a database of sources within the tax preparation system and matching the source information with a known source having current year tax documents available for online download;

in response to matching the source name with the known source or receiving a selection from the plurality of source selection buttons:

requesting account credentials from the taxpayer for the source of the current year tax document identified by the source information or the selection from the plurality of source selection buttons;

receiving the account credentials by the tax preparation system; and automatically accessing the current year tax document from the source of the current year tax document identified by the source information or the selection from the plurality of source selection buttons using the account credentials received from the taxpayer;

storing a current version of the current year tax document;

displaying the request through the user interface, the displaying indicating a remaining one of the plurality of current year tax documents corresponding to the respective one of the plurality of prior year tax documents;

in response to failing to match the source name with a source having current year tax documents available for online download included in the database of sources:

requesting an electronic form of the current year tax document from the taxpayer through image capture or file upload;

receiving the electronic form of the current year tax document; and parsing the current year tax document using optical character recognition and storing the parsed current year tax document according to a standard template for the current year tax document;

converting the automatically accessed current year tax document or the parsed current year tax document into a tax document specific standard data structure corresponding to the current year tax document, wherein the tax document specific standard data structure is formatted for a tax return and supported by multiple tax preparation software applications; and updating the automatically accessed current year tax document by:

in response to the automatically accessing, requesting and receiving authorization from the taxpayer to periodically check for and automatically access an updated version of the current year tax document;

using the account credentials to access the updated version of the current year tax document;

converting the updated version of the current year tax document into the tax document specific standard data structure corresponding to the current year tax document;

deleting the current version of the current year tax document from the tax preparation system;

generating an updated request to the taxpayer to access current year tax documents, wherein the request indicates a plurality of current year tax documents each corresponding to respective ones of the plurality of prior year tax documents and not including the updated version of the current year tax document; and displaying the updated request through the user interface, the displaying indicating a remaining one of the plurality of current year tax documents corresponding to the respective one of the plurality of prior year tax documents.

14. The article of claim 13, wherein the method further comprises:

merging the tax data in the prior year tax return with the tax data from the current year tax documents; and converting the merged tax data into the tax document specific standard data structure; and automatically importing the tax data in the tax document specific standard data structure into a tax return for the taxpayer.

15. The article of claim 14, wherein the merged tax data in the tax document specific standard data structure is presented to the tax preparer and approval of the merged tax data is received prior to automatically importing the tax data into a tax return.

* * * * *